United States Patent [19]

Vernam et al.

[11] 4,098,957

[45] Jul. 4, 1978

[54] ALUMINUM BRAZING SHEET

[75] Inventors: William D. Vernam, New Kensington; Joseph W. Evancho, Murrysville, both of Pa.

[73] Assignee: Aluminum Company of America, Pittsburgh, Pa.

[21] Appl. No.: 854,799

[22] Filed: Nov. 25, 1977

[51] Int. Cl.$^2$ ............................................. B32B 15/20
[52] U.S. Cl. .................................................. 428/654
[58] Field of Search .................. 428/654; 78/147, 148

[56] References Cited

U.S. PATENT DOCUMENTS

| | | | |
|---|---|---|---|
| 2,821,014 | 1/1958 | Miller | 428/654 |
| 3,321,828 | 5/1967 | Miller et al. | 148/24 |
| 3,891,400 | 6/1975 | Robinson | 428/654 |
| 3,963,454 | 6/1976 | Singleton, Jr. | 428/654 |
| 3,994,695 | 11/1976 | Setzer et al. | 428/654 |

*Primary Examiner*—Arthur J. Steiner
*Attorney, Agent, or Firm*—Andrew Alexander

[57] ABSTRACT

An aluminum brazing sheet comprises a core of an aluminum alloy and a first layer of an aluminum brazing alloy provided on at least one side of the core to form a composite. A second layer of an aluminum alloy is clad on both sides of the composite. The aluminum alloy of the second layer contains 0.5 to 1.2 wt.% Mg and 1.2 to 1.8 wt.% Si. In addition, the aluminum alloy of the second layer can contain 0.2 wt.% Cu max., 0.7 wt.% Fe max., 1.5 wt.% Mn max., the remainder aluminum and incidental impurities. The second layer has a melting point substantially equivalent to the melting point of the brazing layer.

3 Claims, 2 Drawing Figures

ALUMINUM BRAZING SHEET

INTRODUCTION

This invention relates to aluminum brazing sheet and more particularly it relates to aluminum composition sheet used for vacuum brazing.

In the prior art, it is known that brazing may be used to join pieces of aluminum together by employing a low-melting aluminum-silicon alloy and a suitable flux in a brazing furnace operating at a temperature between the melting temperature of the aluminum-silicon alloy and that of the higher melting alloy being joined. It is also known that the aluminum structural member, i.e. the higher melting alloy being joined, and the brazing alloy may be bonded together by hot rolling to form a composite sheet having the brazing alloy on one or both surfaces thereof with the higher melting alloy constituting the core of the sheet. The resulting composite is employed in making brazed assemblies.

In the prior art it is also known that fluxless brazing may be used to join pieces of aluminum together by exposing the surfaces to be joined to magnesium vapor during the brazing operation. This method of brazing is disclosed in U.S. Pat. No. 3,321,828. The magnesium may be provided at the juncture to be joined in the form of an aluminum brazing sheet containing magnesium and silicon. Magnesium has a comparatively high vapor pressure. Thus, U.S. Pat. No. 3,891,400 discloses that to prevent premature vaporization during the brazing operation, the magnesium containing member, e.g. aluminum brazing alloy consisting essentially of 5.0 to 15.0 wt.% Si, 0.5 to 5.0 wt.% Mg, max. 0.8 wt.% Fe, max. 0.25 wt.% Cu, max. 0.2 wt.% Zn, max. 0.2 wt.% Mn, should be clad with a magnesium-free aluminum alloy.

The production of brazing sheet employing a silicon or silicon-magnesium containing aluminum alloy on an aluminum core is not without problems. For example, when rolling an ingot clad on one side with brazing alloy, i.e. silicon or silicon-magnesium containing sheet, often it will be found that the slab being formed tends to bow or curl making further rolling of it difficult without damaging the rolling equipment. Furthermore, in reducing such slab to brazing sheet thickness in a continuous mill, other problems such as cobbling can result, i.e. accumulations of sheet between rolling stands due to slippage and failure of the rolls to grab or grip the sheet as it is fed into succeeding rolling stands. It will be appreciated that considerable expense can be incurred in downtime in correcting the bowing or cobbling problems.

The present invention permits the production of brazing sheet in a highly economical manner by utilizing a process which substantially eliminates the problems of bowing and curling and which, quite surprisingly, prevents premature evaporation of magnesium during the brazing operation, when magnesium is present in a cladding on the brazing alloy.

SUMMARY OF THE INVENTION

An object of the present invention is to provide aluminum brazing sheet.

Another object of the present invention is to provide aluminum brazing composite sheet having a cladding on the brazing layer.

Yet a further object of the present invention is to provide aluminum brazing composite sheet having a cladding thereon containing magnesium silicide.

These and other objects will become apparent from the drawings, specification and claims attached hereto.

An aluminum brazing sheet comprises a core of an aluminum alloy, a first layer of an aluminum brazing alloy provided on at least one side of the core, and a second layer of an aluminum alloy cladding the outsides of at least one of the core and first layer. The aluminum alloy of the second layer contains 0.5 to 1.2 wt.% Mg and 1.2 to 1.8 wt.% Si. That is, preferably the Mg and Si are provided in amounts to form $Mg_2Si$ which will also substantially avoid excess Mg or primary Si particles. In addition, the aluminum alloy of the second layer contains 0.2 wt.% Cu max., 0.7 wt.% Fe max., 1.5 wt.% Mn max., the remainder aluminum and incidental impurities. The aluminum alloy of the second layer has a melting point substantially equivalent to the melting point of the brazing layer.

DETAILED DESCRIPTION OF THE PREFERRED EMBODIMENTS

Figure 1:
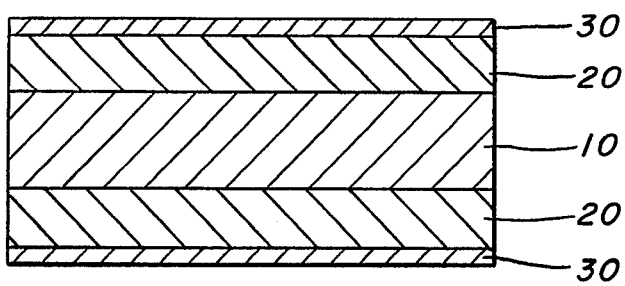
FIGS. 1 and 2 depict cross sections of the brazing sheet in accordance with the invention.
Figure 2:
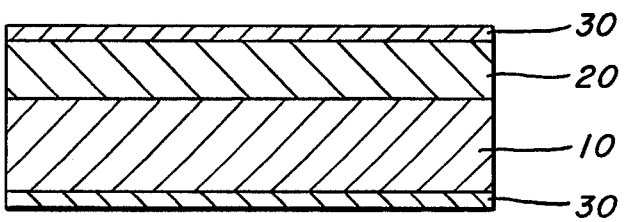

By reference to FIGS. 1 and 2, it will be seen that the brazing composite of the present invention comprises an aluminum core 10, an aluminum brazing layer 20 clad on at least one side of core 10, and an aluminum layer 30 clad on the outsides of at least one of the brazing layers and the core. In accordance with the principles of the present invention, controlled amounts of magnesium and silicon are provided in layer 30 in order to control the melting thereof and in order to complement the melting of brazing layer 20 during the brazing operation. It is important to provide controlled amounts of magnesium and silicon in layer 30 for purposes of providing a structure comprising $Mg_2Si$ and aluminum. That is, it is important that elemental or free magnesium or primary silicon particles be avoided. Primary silicon particles can interfere with rolling operations. Thus, free or elemental silicon which would interfere with rolling should not be permitted. With respect to the composition of the alloy, it permits high quality fillets at the joints by allowing a high degree of penetration or flow of the brazing alloy into the joint area. That is, high purity aluminum alloys, e.g. aluminum alloy 1145, because of their relatively high melting point, can hinder or delay flow or penetration at the joint area.

With respect to soluble or excess magnesium present in layer 30, it should preferably be kept to a minimum. The presence of elemental magnesium in amounts particularly greater that 0.5 wt.% result in an aluminum alloy in which can be extremely difficult to roll. Also, excess magnesium can depress the melting point of the layer 30 below that of the brazing layer. In addition, any excess Mg will form MgO thereby interfering with the brazing process.

As noted hereinabove, layer 30 of an aluminum alloy is provided having controlled amounts of magnesium silicide to provide controlled melting of layer 30 at a temperature substantially equivalent to that of the brazing alloy. Thus, layer 30 should contain 0.5 to 1.2 wt.% Mg and 1.2 to 1.8 wt.% Si. As noted earlier, serious problems can be encountered during the rolling operation if silicon is not controlled. That is, cobbling can result in the continuous rolling mill due to slippage and failure of the rolls to grab or bite the sheet as it is fed into succeeding rolling stands. Scrap generation due to cobbling and bowing or curling can amount to as much as 50 to 60% of the material being rolled. However, by controlling elemental silicon scrap generation due to cobbling can be reduced considerably. In addition to the controls provided on magnesium and silicon, aluminum alloy layer 30 should contain not more than 0.7 wt.% Fe and preferably not more that 0.4 wt.% Fe. Also, the amount of copper present should not be more than 0.2 wt.% with a preferred amount being not more than 0.1 wt.%. Also, manganese may in certain instances be as high as 1.5 wt.%, however, preferably it should not exceed 0.3 wt.%. The remainder of the alloy should consist essentially of aluminum and incidental impurities.

With respect to core 10, the aluminum alloy used therein should be selected to provide requisite structural properties. Thus, the alloy used in core 10 can contain 1.5 wt.% Mn max., 0.7 wt.% Mg max. with a preferred maximum being 0.5 wt.%, 0.5 wt.%, Si max., preferably 0.2 wt.% Si max., 0.7 wt.% Fe max., with total Fe and Si max. being 0.8 wt.%, 0.25 wt.% Cu max., 3.0 wt.% Zn max., 0.25 wt.% Cr max., the remainder aluminum and incidental impurities. Preferably, such aluminum alloys include 3003, 3105, 3005 and the like which provide higher strengths than commercial purity aluminum and the structural rigidity needed in brazed assemblies.

The brazing layer can contain 0.1 to 2.5 wt.% Mg, 5.0 13 wt.% Si, 0.8 wt.% Fe max., 0.3 wt.% Cu max., 0.3 wt.% Zn max., 0.3 wt.% Mn max., the remainder aluminum and incidental impurities.

For purposes of the present invention, the aluminum alloy used for the core must have a higher melting temperature than that of the brazing alloy. Typical melting temperatures for core material are in the range of 1125° to 1215° F and typical temperatures for the brazing alloy are in the range of 1070° to 1135° F. Thus, for purposes of the present invention, the magnesium silicide content should be controlled so as to permit layer 30 to melt in the range of 1070° to 1135° F, that is, in the same range as the brazing alloy.

While the inventors do not necessarily wish to be held to any theory of invention, it is believed that the presence of magnesium silicide in the outer layer results in better flow characteristics of the brazing alloy. That is, having an outer layer or cladding which melts at about the same temperature as the brazing alloy aids of the flow of the brazing alloy into the joints. By comparison, a high purity material clad on the brazing layer can, because of the higher melting point of the higher purity material, resist flow of the brazing alloy into the joints, resulting in inferior fillets. In addition, it is believed that the presence of Mg$_2$Si is beneficial by providing readily available magnesium which aids the wetting characteristics during brazing.

In fabrication of brazing sheet in accordance with the principles of the present invention, an ingot of aluminum alloy for use as the core 10 is first normally scalped to remove surface irregularities therefrom. After scalping, the ingot normally has a thickness in the range of 10 to 20 inches, depending on ingot size. An ingot of brazing alloy which has been previously wrought or formed into a slab having a thickness in the range of 1 to 3 inches is secured as by straps or the like to the ingot for use as the core to provide a composite assembly. A layer of aluminum alloy containing controlled amounts of Mg$_2$Si is also secured to the outside surfaces of the composite assembly to provide a composite after rolling substantially as shown in the FIGS. The layer can range from 0.25 to 1.0 inch thick on the ingot and should constitute 0.5 to 10% of the final composite assembly. It should be understood that this last layer may be bonded to the brazing alloy as by hot rollig prior to being secured to the ingot used for the core material. Such a layer may be bonded to both surfaces of the brazing alloy also to secure good rolling characteristics without cobbling. Other combinations may be used as long as the above thicknesses are maintained. For purposes of bonding the composite, it is first heated to a temperature in the range of 850° to 950° F and then hot rolled in a reversing mill to a thickness in the range of about 2.0 to 4.0 inches. During such rolling, because of the outer layers, the top and bottom rolls on the reversing mill encounter identical alloys thus preventing bowing or curling of the assembly as it is rolled. Control of free silicon in the outer layer is important for additional reasons as discussed hereinafter.

It is believed that one cause of the bowing or curling of an assembly with different alloys on the top and bottom surfaces results from different coefficients of friction between the alloys and the rolls. This causes one alloy to elongate faster than the other. However, as noted, in the present invention, when a layer of aluminum alloy substantially free of eutectic or elemental silicon is provided on the core and on the brazing layer both rolls encounter the same alloy, substantially eliminating the bowing problem.

To further reduce the composite to brazing sheet thickness, e.g. 0.012 to 0.125 inch, it is passed through a continuous rolling mill. It is in this rolling operation that freedom from detrimental amounts of silicon in the outer layer has particular significance. In the continuous mill, the presence of eutectic silicon in the outer or cladding layer can result in serious cobbling problems which, as explained earlier, is an accumulation of brazing sheet between stands in the continuous rolling mill. Obviously, these accumulations twist, score and distort the sheet resulting in large amounts of scrap metal and in considerable mill downtime for scrap removal. The problem is further compounded by the fact that prior rolling operations are severely curtailed and very often partially rolled ingot and slab must be returned for heating to suitable rolling temperatures which, obviously is very inefficient and greatly increases the heating energy requirements for rolling.

The cobbling results mostly from the presence of eutectic or elemental silicon in the cladding or outer layer. That is, elemental silicon in the cladding results in a surface which provides low friction and poor biting or entry characteristics with respect to the rolls of the continuous rolling mill. To achieve entry to the mill, it may be necessary to schedule smaller gauge reductions which are inefficient and may require additional rolling passes to reach the desired sheet thickness, an expensive and energy-consuming operation. Thus, in a multi-stand mill, i.e. a continuous rolling mill, a rolling stand may have satisfactory friction and entry characteristics with respect to the sheet and the gauge of brazing alloy and the next stand may have unsatisfactory friction and biting characteristics for the reduction required for efficient operation, resulting in an accumulation of sheet between the stands or the cobbling problem. In the case of conventional silicon-aluminum and silicon-magnesium-aluminum clad brazing sheet, as many as 20% of the composites may cobble during hot rolling. However, when the cladding is provided on the core on the brazing layer in accordance with the present invention, cobbling can be reduced to less than 3% of the ingots being rolled.

It should be noted that a layer of an aluminum alloy, e.g. 1145, 1100, 3003, 7072 or the like, may be interposed between the brazing layer and the core material, if desired.

In the continuous rolling operation, it is preferred to keep the temperature of the sheet between 500° F to 800° F. In certain instances, when it is desired to cold roll the brazing sheet to gauges less than 0.125 inch, it may be desirable to anneal the sheet prior to such cold rolling. For annealing purposes, the sheet should be subjected to a temperature of about 600° to 760° F for a period in the range of 1 to 2 hours.

The following examples are still further illustrative of the invention.

EXAMPLE 1

A specimen having a thickness of 0.020 inch was prepared using a core of aluminum alloy 3005, and a brazing layer consisting essentially of 8.84 wt.% Si, 0.5 wt.% Mg and 0.26 wt.% Fe, the remainder aluminum. A cladding was provided on the braze layer, the cladding consisting essentially of 1.45 wt.% Si, 0.5 wt.% Mg and 0.16 wt.% Fe, the remainder aluminum. The brazing layer had a thickness of about 15% of the total thickness and the cladding had a thickness of about 10% of the brazing layer. The edge of the specimen was held in contact with a flat sheet of aluminum alloy 3003. The assembly was subjected to a temperature of about 1125° F at a vacuum level of $10^{-5}$ torrs for purposes of joining the specimen and the flat sheet. Upon cooling, inspection of the assembly showed a continuous fillet having a smooth appearance, indicating a high quality joint.

EXAMPLE 2

A specimen was prepared as in Example 1 except the brazing layer consisted essentially of 11.5 wt.% Si, 0.25 wt.% Fe and 0.1 wt.% Mg, the remainder aluminum. The specimen was assembled and treated as in Example 1. The fillet formed between the specimen and the flat sheet exhibited discontinuities indicating a joint of relatively poor quality.

EXAMPLE 3

A specimen was prepared as in Example 1 except the cladding consisted essentially of 1.08 wt.% Si, 0.8 wt.% Mg and 0.15 wt.% Fe, the remainder aluminum. The specimen was assembled and treated as in Example 1. Upon cooling, inspection of the assembly showed a continuous fillet having a smooth appearance indicating a high quality joint.

For comparison purposes, a test specimen was prepared as in Example 1 except it did not have a cladding. Inspection of the assembly, after the brazing operation, showed a discontinuous fillet exhibiting considerable shrinkage which, of course, indicates a poor quality braze joint.

While this invention has been described in terms of preferred embodiments, the claims appended hereto are intended to encompass other embodiments which fall within the spirit of the invention.

Having thus described the invention and certain embodiments thereof, what is claimed is:

1. An aluminum brazing sheet comprising:
   (a) a core of an aluminum alloy;
   (b) a first layer of an aluminum brazing alloy consisting essentially of 0.1 to 2.5 wt.% Mg, 5.0 to 13.0 wt.% Si, 0.8 wt.% Fe max., 0.3 wt.% Cu max., 0.3 wt.% Zn max. and 0.3 wt.% Mn max., the remainder aluminum, provided on at least one side of said core to form a composite; and
   (c) a second layer of an aluminum alloy clad on both sides of the composite, said second layer consisting essentially of 0.5 to 1.2 wt.% Mg, 1.2 to 1.8 wt.% Si, 0.2 wt.% Cu max., 0.7 wt.% Fe max., 1.5 wt.% Mn max., the remainder aluminum said alloy in said second layer having a melting point substantially equivalent to the melting point of said brazing layer.

2. The brazing sheet according to claim 1 wherein the core consists essentially of 1.5 wt.% Mn max., 0.7 wt.% Mg max., 0.5 wt.% Si max., 0.7 wt.% Fe max., 0.25 wt.% Cu max., 3.0 wt.% Zn max. and 0.25 wt.% Cr max., the remainder aluminum.

3. The brazing sheet according to claim 1 wherein the second layer of aluminum alloy contains less than 0.5 wt.% excess Mg.

* * * * *